(12) United States Patent
Engstrand

(10) Patent No.: US 10,132,655 B2
(45) Date of Patent: Nov. 20, 2018

(54) APPARATUS, SYSTEM AND METHOD FOR DETECTING A POSITION OF A MOVABLE OBJECT IN A DEVICE AND USING THE SAME FOR CONTROLLING THE DEVICE

(71) Applicant: Phaedrus, LLC, Hartford, WI (US)

(72) Inventor: Bradley W. Engstrand, Hartford, WI (US)

(73) Assignee: PHAEDRUS, LLC, Hartford, WI (US)

( * ) Notice: Subject to any disclaimer, the term of this patent is extended or adjusted under 35 U.S.C. 154(b) by 0 days.

(21) Appl. No.: 14/708,742

(22) Filed: May 11, 2015

(65) Prior Publication Data

US 2015/0323671 A1    Nov. 12, 2015

Related U.S. Application Data

(60) Provisional application No. 61/991,702, filed on May 12, 2014.

(51) Int. Cl.
*G01D 5/30* (2006.01)
*G01S 17/66* (2006.01)
*G01D 5/28* (2006.01)

(52) U.S. Cl.
CPC ............... *G01D 5/30* (2013.01); *G01D 5/285* (2013.01); *G01S 17/66* (2013.01)

(58) Field of Classification Search
CPC ................................. G01D 5/30; G01D 5/285
USPC ......................................... 250/231.1–231.19
See application file for complete search history.

(56) References Cited

U.S. PATENT DOCUMENTS

| 4,204,115 A | * | 5/1980 | Boldridge, Jr. | ........ G01D 5/347 250/227.11 |
| 4,866,269 A | * | 9/1989 | Wlodarczyk | ......... F02D 41/009 250/231.18 |
| 5,001,937 A | * | 3/1991 | Bechtel | ..................... G01L 3/12 250/231.14 |
| 5,471,054 A | * | 11/1995 | Watanabe | .......... G01D 5/24452 250/231.13 |
| 5,983,720 A | * | 11/1999 | Crabb | .................... G01D 5/285 250/231.13 |

(Continued)

FOREIGN PATENT DOCUMENTS

JP     H06265370     9/1994

OTHER PUBLICATIONS

International Search Authority; Search Report and Written Opinion; dated Aug. 7, 2015.

*Primary Examiner* — Thanh Luu
(74) *Attorney, Agent, or Firm* — Lempia Summerfield Katz LLC

(57) ABSTRACT

An apparatus, a system and a method for detecting position of a movable object in a device and using the same for controlling the device. A distance and/or an intensity of emitted light may be measured by using a sensor to emit light and detect light to determine the location of the movable object. The movable element absorbs emitted light from the sensor. The sensor determines and/or measures an intensity of the emitted light from the sensor which is not absorbed by the movable object. The intensity of emitted light is related to the position of the movable object in the device. A microprocessor may determine the position of the movable object based on the intensity of emitted light detected by the sensor. The position of a rotating object on a crankshaft in an engine may be detected.

13 Claims, 7 Drawing Sheets

(56) References Cited

U.S. PATENT DOCUMENTS

| | | | |
|---|---|---|---|
| 6,204,499 B1* | 3/2001 | Schaefer | G01D 5/30 |
| | | | 250/227.14 |
| 6,872,933 B2 | 3/2005 | Wirthlin | |
| 7,388,188 B2 | 6/2008 | Engstrand | |
| 7,820,956 B2 | 10/2010 | Sidor et al. | |
| 8,395,111 B2 | 3/2013 | Phan Le | |
| 8,508,726 B2 | 4/2013 | Benner, Jr. | |
| 8,487,237 B2 | 7/2013 | Watanabe et al. | |
| 8,836,956 B2 | 9/2014 | Jarisch et al. | |
| 2002/0170187 A1* | 11/2002 | Kirschbaum | G01D 5/2457 |
| | | | 33/1 AP |
| 2006/0016970 A1* | 1/2006 | Nagasaka | G01D 5/305 |
| | | | 250/231.13 |
| 2009/0152452 A1* | 6/2009 | Lee | G01D 5/04 |
| | | | 250/231.15 |
| 2011/0139971 A1* | 6/2011 | Phillips | G01B 11/26 |
| | | | 250/231.13 |
| 2011/0240836 A1* | 10/2011 | Phan Le | G01D 5/285 |
| | | | 250/231.11 |

\* cited by examiner

APPARATUS, SYSTEM AND METHOD FOR DETECTING A POSITION OF A MOVABLE OBJECT IN A DEVICE AND USING THE SAME FOR CONTROLLING THE DEVICE

CROSS REFERENCE TO RELATED APPLICATION

This application claims the benefit of U.S. Provisional Application No. 61/991,702, filed May 12, 2014 (May 12, 2014), which is hereby incorporated in its entirety.

BACKGROUND OF THE INVENTION

The present invention generally relates to an apparatus, a system and a method for detecting position. More specifically, the present invention relates to an apparatus, a system and a method for detecting position of a movable object in a device and using the same for controlling the device.

The apparatus, the system and the method for detecting a position and/or an intensity of emitted light may have a sensor array in a compartment for detecting an intensity of emitted light from a light source in a compartment. The sensor array may emit a light, may detect a light, may detect a temperature of air and/or may detect a pressure of air in the compartment. The intensity of emitted light which may be detected by the sensor array may correspond to a position of a movable element within an interior of the compartment. A microprocessor may determine and/or may calculate the position of the movable element within the compartment based on the intensity of emitted light detected by the sensor array. The intensity of the emitted light may be based on an amount of the emitted light which may not be absorbed by an interior of the compartment and/or by the movable element. The microprocessor may monitor strength of the emitted light from the sensor array for compensating or for correcting the sensor array based on the strength of the emitted light from the light source. An output device may be connected to the microprocessor and/or may display information based on the intensity of emitted light detected by the sensor array, a pressure of air in the compartment, a temperature of the air in the compartment, the position of the movable element and/or the strength of the emitted light from the light source.

It is, of course, generally known to measure and/or to detect a position of a movable element in a compartment. The position of the movable element in the compartment may correspond to a location of a machine element which may be connected to and/or may be attached to the movable element. The machine element may be, for example, a piston in a cylinder or a tab connected to a machine part. Monitoring of the position of the movable element in the compartment may lead to detection of irregularities within the machine element or machine part as well as an indication of the overall efficiency of the machine element or machine part. Also, monitoring the position of the movable element may enable the detection and/or calculation of the speed of the machine element or machine part.

Typically, a first sensor in the compartment or adjacent to the movable element must contact the movable element to detect, to determine and/or to measure the position of the movable element with respect to the compartment. The position of the movable element in the compartment may correspond to a position of the machine element and/or the machine part with respect to the compartment. A second sensor may be required to be attached to, to be connected to and/or to contact the movable element, the machine element and/or the machine part to increase an accuracy of the first sensor for detecting and/or for measuring the position of the movable element.

However, contact between the movable element and the first sensor may cause the first sensor to inaccurately detect and/or to inaccurately measure the position of the movable element in the compartment. Further, contact between the movable element and the first sensor may damage and/or may destroy the movable element and/or the first sensor. As a result, the first sensor may be inoperable and/or may inaccurately detect and/or may inaccurately measure the position of the movable element in the compartment. Moreover, contact between the second sensor and the movable element, the machine element and/or the machine part may damage and/or may destroy the second sensor, the movable element, the machine element and/or the machine part. As a result, the second sensor may be inoperable and/or may be incapable of increasing the accuracy of the first sensor.

A need, therefore, exists for an apparatus, a system and a method for detecting a position and/or an intensity of emitted light. Additionally, a need exists for an apparatus, a system and a method for detecting a position and/or an intensity of emitted light which may have a sensor array in a compartment for detecting a position of a movable element in the compartment. Further, a need exists for an apparatus, a system and a method for detecting a position and/or an intensity of emitted light which may detect and/or may measure an intensity of emitted light unabsorbed by an interior surface of the compartment and/or by a movable element in the compartment. Still further, a need exists for an apparatus, a system and a method for detecting a position and/or an intensity of emitted light which may have a sensor array and/or a microprocessor to calculate and/or to determine a position of a movable element in a compartment based on an intensity of emitted light in the compartment.

Moreover, a need exists for an apparatus, a system and a method for detecting a position and/or an intensity of emitted light which may not require contact between a sensor array and a movable element in a compartment to determine the position of the movable element in the compartment. Also, a need exists for an apparatus, a system and a method for detecting position of a movable object in a device and using the same for controlling the device.

SUMMARY OF THE INVENTION

The present invention relates to an apparatus, system and a method for detecting position. More specifically, the present invention relates to an apparatus, system and a method for detecting position of a movable object in a device and using the same for controlling the device.

To this end, in an embodiment of the present invention, a system for detecting a position of a movable object in a device and controlling the device wherein the movable object rotates is provided. The system may have a light source, a detector and a microprocessor. The light source may be located in the device wherein the light source emits light having an intensity onto the movable object and further wherein the intensity of the light changes as the light reflects off the moveable object. The detector may be adjacent to the light source wherein the detector receives the light and measures the intensity of the light reflected off the movable object and further wherein the detector transmits a signal indicative of the position of the moveable object. The microprocessor may be associated with the detector wherein the microprocessor receives the signal from the detector to determine the position of the movable object in the device and to control the device.

In an embodiment, the system may have a shaft having an exterior defined by a surface that is substantially circular wherein the moveable object is connected to the exterior of the shaft and rotates with the shaft.

In an embodiment, the system may have a plate on the moveable object wherein a first area of the plate is lighter than a second area of the gradient wherein the light reflects off the first area and the second area and further wherein the intensity of the light measured by the detector is greater for the light reflected off the first area than the second area.

In an embodiment, the system may have a target on the movable object wherein the target is a mark on the movable object and further wherein the light reflects off the target.

In an embodiment, the system may have a cavity adjacent to the light source wherein the cavity has a top surface, a bottom surface and sides connecting the top surface to the bottom surface wherein the cavity is filled with oil and further wherein the light source emits the light into the cavity.

In an embodiment, the system may have a spiral adjacent to the movable object wherein a distance from a surface of the spiral to the light source changes as the spiral rotates around an axis with the movable object and further wherein the light reflects off the surface of the spiral.

In an embodiment, the system may have a monitor connected to the microprocessor wherein the monitor receives the signal from the microprocessor and further wherein the monitor uses the signal to display information.

In another embodiment of the present invention, a method for detecting a position of a movable object and using the position to control the device wherein the movable object is connected to a shaft in the device and further wherein the movable object rotates with the shaft is provided. The method may have the step of focusing light having an intensity onto a target on the movable object. The method may have the step of reflecting the light off the target of the movable object. The method may have the step of detecting a change in the intensity of the light reflected off the target of the movable object to produce a signal indicative of the rotation of the movable object and the shaft. The method may have the step of determining the position of the movable object from the signal.

In an embodiment, the method may have the step of changing a distance between the movable object and a detector.

In an embodiment, the method may have the step of changing a timing of the rotation of the movable object.

In an embodiment, the method may have the step of optimizing performance of the device.

In an embodiment, the method may have the step of reflecting the light off the shaft to produce the signal.

In an embodiment, the method may have the step of determining the position of the movable object at any location in a revolution of the moveable object.

In another embodiment of the present invention, an apparatus for detecting a signal indicative of a rotation of a movable object in a device is provided. The apparatus may have a light source and a microprocessor. The light source may be remote from the movable object wherein the light source emits light having an intensity and further wherein the light reflects off the movable object. The microprocessor may be in the device wherein the microprocessor detects the intensity of the light reflected off the moving object and further wherein the microprocessor uses the signal to determine a location of the movable object in a revolution of the movable object.

In an embodiment, the apparatus may have a target on the movable object wherein target is a piece of tape and the light reflects off the target.

In an embodiment, the apparatus may have a shaft having a first end and second end wherein the second end is positioned opposite to the first end wherein the movable object is connected to the shaft between the first end and the second end and further wherein the shaft rotates with the movable object.

In an embodiment, the apparatus may have a plate adjacent to the movable object wherein the plate is substantially circular wherein the plate has a first area and a second area wherein the first area is darker than the second area wherein the light reflects off the first area and the second area and further wherein the intensity of light reflected off the first area is greater than the intensity of light reflected off the second area.

In an embodiment, the apparatus may have a cavity having a top surface, a bottom surface and sides connecting the top surface to the bottom surface wherein the cavity is filled with oil and further wherein the light source is adjacent to the cavity and emits the light into the cavity.

In an embodiment, the apparatus may have a spiral adjacent to the movable object wherein a distance from a surface of the spiral to the light source changes as the spiral rotates around an axis with the movable object and further wherein the light reflects off the surface of the spiral.

In an embodiment, the apparatus may have a monitor connected to the microprocessor wherein the monitor receives the signal from the microprocessor to display information related to the signal.

It is, therefore, an advantage of the present invention to provide an apparatus, system and a method for detecting position of a movable object in a device and using the same for controlling the device.

An advantage of the present invention is to provide an apparatus, system and a method for detecting position of a movable object in a device and using the same for controlling the device which is constructed of materials and/or components that do not interfere with the operation of the device.

Another advantage of the present invention is to provide an apparatus, system and a method for detecting position of a movable object in a device and using the same for controlling the device which may allow a user to adjust the timing of the device.

A further advantage of the present invention is to provide an apparatus, system and a method for detecting position of a movable object in a device and using the same for controlling the device which may allow a user to adjust the timing of the engine for optimizing performance and efficiency.

Another advantage of the present invention is to provide an apparatus, system and a method for detecting position of a movable object in a device and using the same for controlling the device which may allow a user to adjust the operation of the device.

A further advantage of the present invention is to provide an apparatus, system and a method for detecting position of a movable object in a device and using the same for controlling the device which may allow a user to optimize the performance of the device.

Moreover, an advantage of the present invention is to provide an apparatus, system and a method for detecting position of a movable object in a device and using the same for controlling the device which may be used without causing harm to the device while in use.

Another advantage of the present invention is to provide an apparatus, system and a method for detecting position of a movable object in a device and using the same for controlling the device which may be used to maximize the efficiency of the device.

Another advantage of the present invention is to provide an apparatus, system and a method for detecting position of a movable object in a device and using the same for controlling the device which has reliability.

Yet another advantage of the present invention is to provide an apparatus, system and a method for detecting position of a movable object in a device and using the same for controlling the device which has a long operating life.

A further advantage of the present invention is to provide an apparatus, system and a method for detecting position of a movable object in a device and using the same for controlling the device which has low maintenance requirements.

Another advantage of the present invention is to provide an apparatus, system and a method for detecting position of a movable object in a device and using the same for controlling the device which may operate in environments of electrical fields to one million volts at nine hundred thousand amps with no effect.

A further advantage of the present invention is to provide an apparatus, system and a method for detecting position of a movable object in a device and using the same for controlling the device which has a frequency response greater than twenty-five kHz.

Moreover, an advantage of the present invention is to provide an apparatus, system and a method for detecting position of a movable object in a device and using the same for controlling the device which may detect the position of the object traveling at any speed.

An advantage of the present invention is to provide an apparatus, system and a method for detecting position of a movable object in a device and using the same for controlling the device which is capable of use in various environmental conditions.

A further advantage of the present invention is to provide an apparatus, system and a method for detecting position of a movable object in a device and using the same for controlling the device which has no magnets or coils, extremely low electrical noise and is inherently weld field immune.

Still further, an advantage of the present invention is to provide an apparatus, system and a method for detecting position of a movable object in a device and using the same for controlling the device which is capable of use with fiber optic systems.

Yet another advantage of the present invention is to provide an apparatus, system and a method for detecting position of a movable object in a device and using the same for controlling the device which is inexpensive.

An advantage of the present invention is to provide an apparatus, system and a method for detecting position of a movable object in a device and using the same for controlling the device which has a target wherein the physical shape of the target is changed to meet the needs of electronic signaling.

Another advantage of the present invention is to provide an apparatus, system and a method for detecting position of a movable object in a device and using the same for controlling the device which has a target wherein the physical texture of the target is changed to meet the needs of electronic signaling.

A further advantage of the present invention is to provide an apparatus, system and a method for detecting position of a movable object in a device and using the same for controlling the device which has a target wherein the physical light gradient of the target is changed to meet the needs of electronic signaling.

Yet another advantage of the present invention is to provide an apparatus, system and a method for detecting position of a movable object in a device and using the same for controlling the device which has a target wherein the physical shape of the target is changed in more than one axis.

Still further, an advantage of the present invention is to provide an apparatus, system and a method for detecting position of a movable object in a device and using the same for controlling the device which has a target wherein the physical composition of the target is changed.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

The present invention relates to an apparatus, system and a method for detecting position of a movable object in a device and using the same for controlling the device.

Applicant hereby incorporates by reference U.S. Pat. No. 7,388,188 B2 entitled "Apparatus, system and method for detecting a position of a movable element in a compartment" and U.S. Pat. Nos. 8,436,287 B2, 8,115,185 B2, 7,935,916

B2 and 7,626,153 each entitled "System and/or method for reading, measuring and/or controlling intensity of light emitted from an LED" in their entirety in this disclosure.

In view of and with reference to the disclosures of U.S. Pat. Nos. 7,388,188 B2, 8,436,287 B2, 8,115,185 B2, 7,935,916 B2 and 7,626,153, embodiments of the present invention may provide an apparatus, a system and a method for detecting position of a movable object in a device and using the same for controlling the device. In an embodiment, an apparatus, a system and a method for detecting position of a movable object in a device and using the same for controlling the device may detect the position of an object on a rotating crankshaft within an engine. The position of the object may be used to adjust the timing of the engine for optimizing performance and/or efficiency. The object may be a magnet or other object connected to the crankshaft. In another embodiment, the object may be a marking on the crankshaft.

Typically, for example, an engine may have a reciprocating piston in a cylinder. The piston may be connected to a rotating crankshaft by a connecting rod. The engine may be a two-stroke or a four stroke gas combustion engine. The engine may also have multiple pistons operating in respective cylinders. For example, the engine may have between three and sixteen cylinders. The cylinders may be arranged in a line or in a v-shape. The cylinders may also be horizontally opposed. The engine may provide power to drive a vehicle, a boat, a machine and/or the like.

Figure 1:
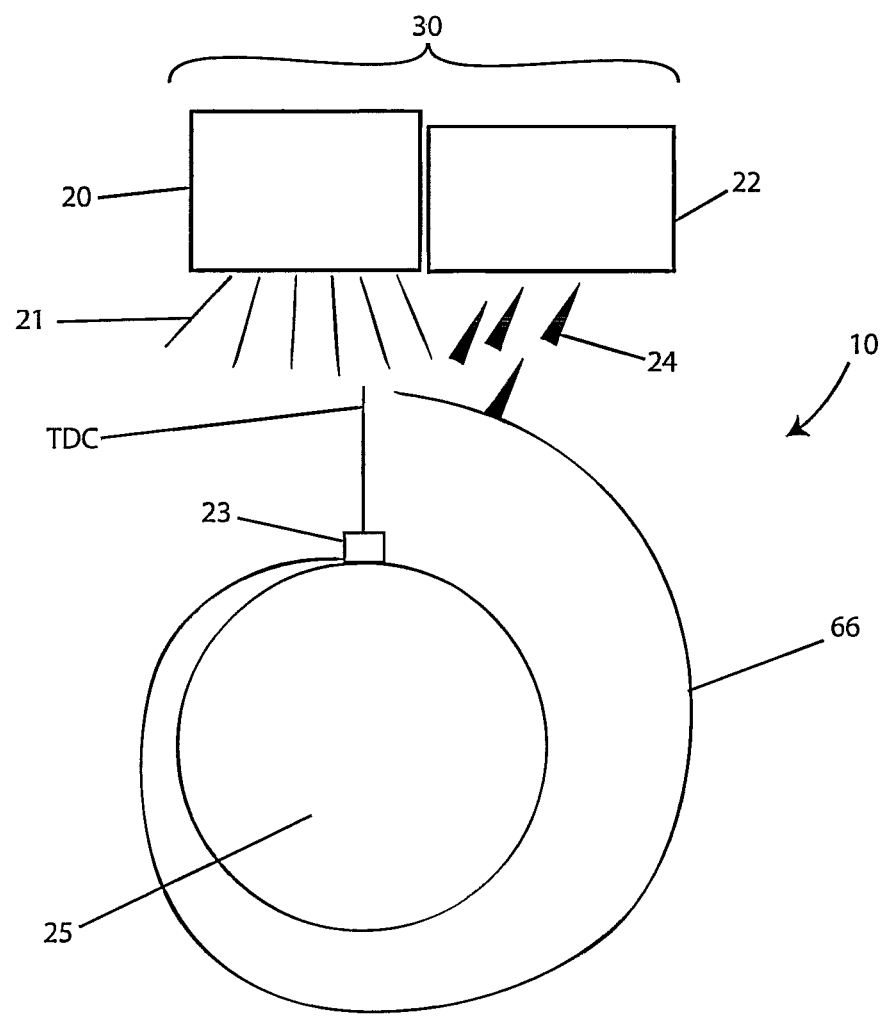
FIG. 1 illustrates a schematic view of a system for detecting position of a movable object in a device and using the same for controlling the device in accordance with an embodiment of the present invention.

Referring now to the drawings, wherein like numerals refer to like parts, FIG. 1 illustrates an embodiment of a system 10 for detecting position of a rotating object in a device. The system 10 may have a light source 20, such as a QVLA® (a registered trademark of Motion Controls LLC) light source. For example, the light source 20 may be a light emitting diode, "LED". The system 10 may also have a light detector 22, such as a QVLA® light detector.

The light source 20 may provide an emitted light beam 21. The emitted light beam 21 from the light source 20 may impinge upon a movable object 23. The movable object 23 may be, for example, a tab, a magnet, a marking and/or the like. In an embodiment, the movable object 23 may be mounted to and/or may be connected to a crankshaft 25 as shown in FIG. 1. However, the crankshaft 25 may be a camshaft or other rotating shaft which may be connected within an engine (not shown). Other shafts may also be used in other applications than in an engine. The present invention is not intended to be limited to crankshafts 25 in engines.

Also, a reflected light beam 24 may reflect from the movable object 23 on the crankshaft 25. The reflected light beam 24 may impinge on the light detector 22. The light source 20 and the light detector 22 may be collectively referred to herein as a sensor 30, such as a QVLA® sensor. The system 10 may operate in a manner as disclosed in U.S. Pat. Nos. 7,388,188 B2; 8,436,287 B2; 8,115,185 B2; 7,935,916 B2 and 7,626,153.

Figure 2A:
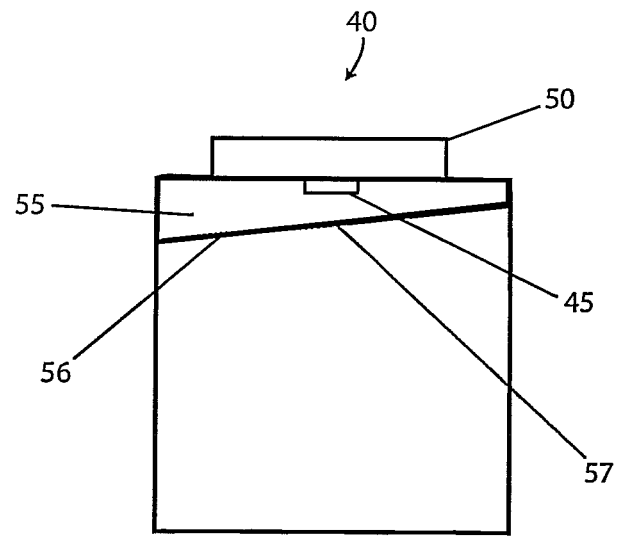
FIG. 2A illustrates a schematic side view of a rotational sensor for use in a system for detecting position of a movable object in a device and using the same for controlling the device in accordance with an embodiment of the present invention.
Figure 2B:
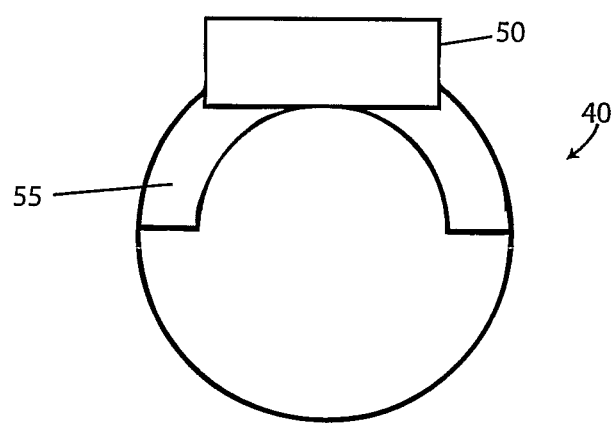
FIG. 2B illustrates a schematic top view of a rotational sensor for use in a system for detecting position of a movable object in a device and using the same for controlling the device in accordance with an embodiment of the present invention.

FIGS. 2A and 2B illustrate schematic views of another embodiment of a rotational sensor 40 for use in the system 10 for detecting position of the movable object 23 in a device and using the same for controlling the device. FIG. 2A is a side view of the rotational sensor 40, and FIG. 2B is a top view of the rotational sensor 40. In an embodiment, the rotational sensor 40 may have an LED 45. The LED 45 may preferably be the light source 20 as shown in FIG. 1. The rotational sensor 40 may also have electronics 50 that may operate the LED 45 and/or may perform other control and/or measurement functions of the rotational sensor 40.

In the embodiment shown in FIGS. 2A and 2B, the rotational sensor 40 may have an oil filled cavity 55. A bottom 56 of the oil filled cavity 55 may have a sloped floor 57. When filled with light from the LED 45 and sensed by the light detector 22, rotation may be resolved from the change in light intensities resulting from the change of volume from the sloped floor 57 of the oil filled cavity 55 moving below the light detector 22.

Figures 3A, 3B, 3C:
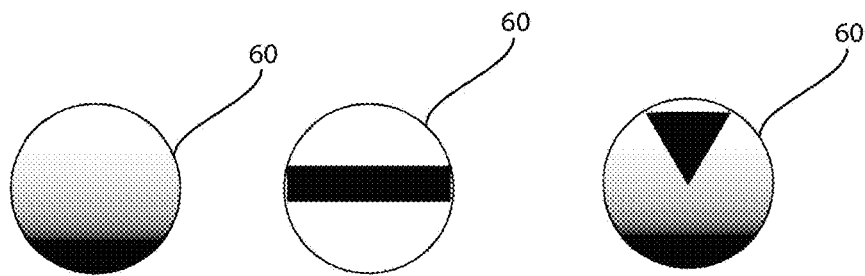
FIGS. 3A 3B and 3C illustrate schematic views of gradient targets in accordance with an embodiment of the present invention.
Figures 4A, 4B, 4C:
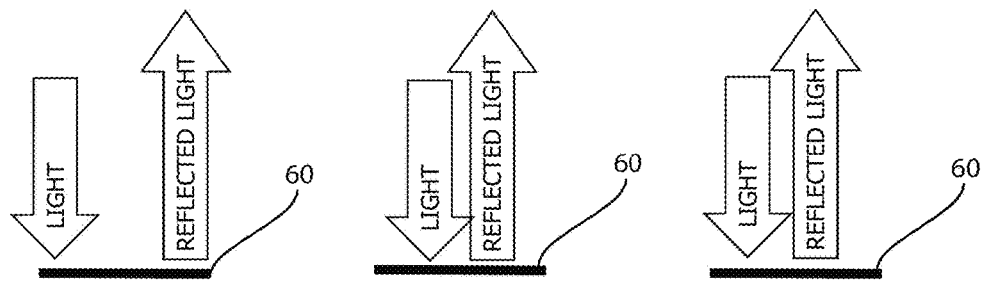
FIGS. 4A, 4B and 4C illustrate schematic views of relative positions of a light emitter and a light detector in accordance with an embodiment of the present invention.

In an embodiment, obtaining a signal for a rotational operation from the system 10 using the light source 20 and the light detector 22 may be accomplished in different manners. For example, the signal may be obtained by having a gradient as shown in FIGS. 3A, 3B and 3C that may be read by the sensor 30. The light source 20 and the light detector 22 may be placed side by side, across a width from each other and/or one may be centered and the other may be located elsewhere. The placement of the light source 20 and the light detector 22 may be selected based upon the signal and gain desired for the particular application. FIGS. 4A, 4B and 4C illustrate side views of profiles of positioning of the light source 20 and the light detector 22. As shown in FIG. 4A, the light source and the light detector 22 may both be positioned off center. As shown in FIG. 4B, the light source 20 may be positioned on center, and the light detector 22 may be positioned off center. As shown in FIG. 4C, the light source 20 may be positioned off center, and the light detector 22 may be positioned on center.

The gradients read by the sensor 30 shown in FIGS. 3A, 3B and 3C may be located on a plate 60. The plate 60 may be flat; however, other shapes may be used. Patterns may be used to facilitate signal response. For example, in FIG. 6, instead of having a physical piece shaped like the spiral 66, a pattern may be applied to a shaft 63 which may rotate about an axis A. The pattern may wrap around the shaft 63. The pattern may be printed on tape and/or like material and/or wrapped around the shaft 63. Any material that affects light may be used. In an embodiment, a surface roughness and/or texture may be detected. Thus, as a bearing may start to fail, for example, the bearing may start create a mark on the shaft 63. The light detector 22 may detect the change in the reflected light. Therefore, anything that affects light may be used.

The light from the light source 20 may shine on the gradient on the plate 60. The light detector 22 may measure the reflected light off the gradient on the plate 60. As the plate 60 may rotate, the signal from the gradient on the plate 60 may indicate degrees of rotation according to the reflected light measured by the light detector 22. The output signal may be analog. Due to the nature of the analog signal, the signal may have infinite resolution.

The gain and/or the shape of the signal curve may be controlled by the type of material used, the profile or shape, the texture, the color and/or the like that may be coupled with electronics. The electronics may also change the gain and the shape of the signal curve. Also, other combinations of distance and the plate 60 may create a certain signal.

Various shapes may be used. For example, a small aperture may be located in a bearing race. As the bearing wears over time, the ball may flatten. The flattening may cause the reflection of the light to change. The sensor 30 may detect the change in the reflected light. Also, a cable winding on a drum may flatten as the device ages. The sensor 30 may detect the change in the reflected light. Further, a pattern may be cut into a shaft by a laser, for example. If the pattern is altered, the sensor 30 may detect the change in the reflected light. In another example, instead of using a bar code or QR codes with digital lines or blocks, the lightness and/or brightness may be detected to identify the object. A QR code may be altered to have different intensities or colors of light to make the matrix wider.

Figure 5A:
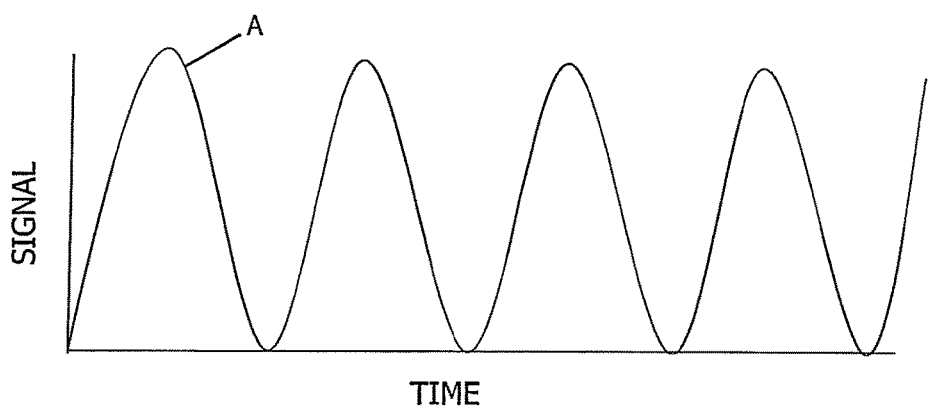
FIGS. 5A, 5B and 5C illustrate signal profiles in accordance with an embodiment of the present invention.
Figure 5B:
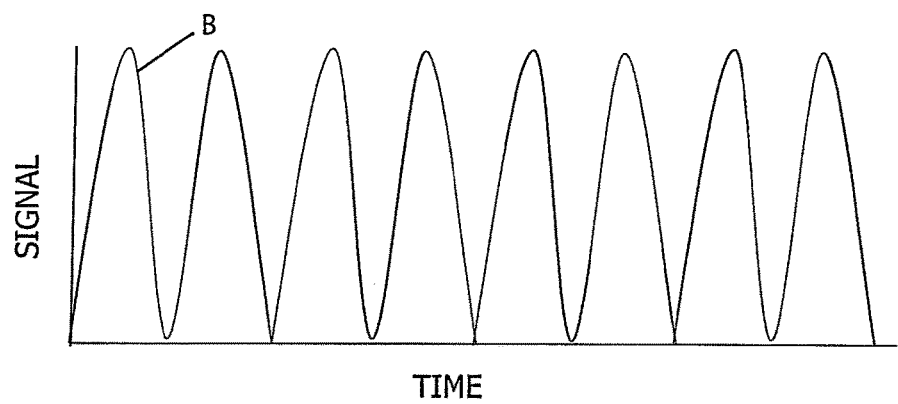
Figure 5C:
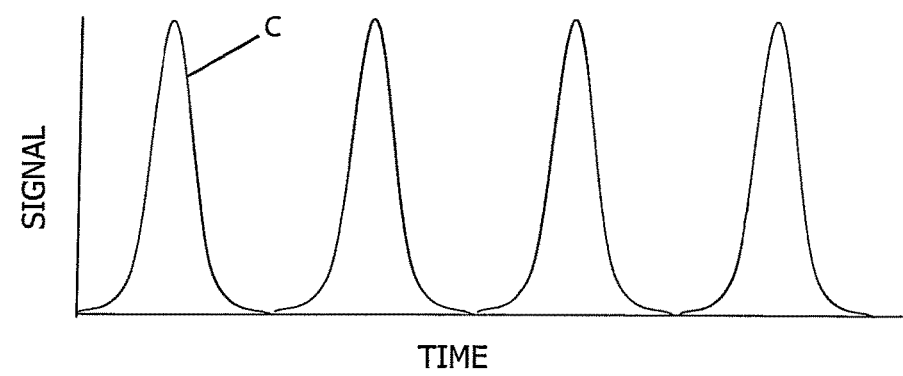

FIGS. 5A, 5B and 5C illustrate signals that may be derived from the corresponding gradients illustrated in FIGS. 3A, 3B and 3C. The signals illustrate magnitude of the signal on the y-axis and time on the x-axis. Thus, the signal of Profile A shown in FIG. 5A may correspond to the reflected light measured by the light detector 22 from the gradient shown in FIG. 3A. The signal of Profile B shown in FIG. 5B may correspond to the reflected light measured by the light detector 22 from the gradient shown in FIG. 3B. The signal of Profile C shown in FIG. 5C may correspond to the reflected light measured by the light detector 22 from the gradient shown in FIG. 3C.

In another embodiment, obtaining the signal for the rotational operation from the system 10 using the light source 20 and the light detector 22 may be accomplished by increasing the distance between the movable object 23 and the sensor 30, as shown in FIG. 1. The relative movement may have a nautilus shell type shape, a swirl and/or a spiral 66. The spiral 66 may be performed on any axis desired. Generally, the reflected output of light may be represented by a relationship in which the intensity of the light decreases with square of the distance from the detector in a 1/x2 curve. If desired, the shape of the movable object 23 may be changed to provide a native output that is linear. With any shape and/or printed gradient, the gain may be adjusted by altering the dynamic motion and/or physical shape of the movable object 23.

Figure 6:
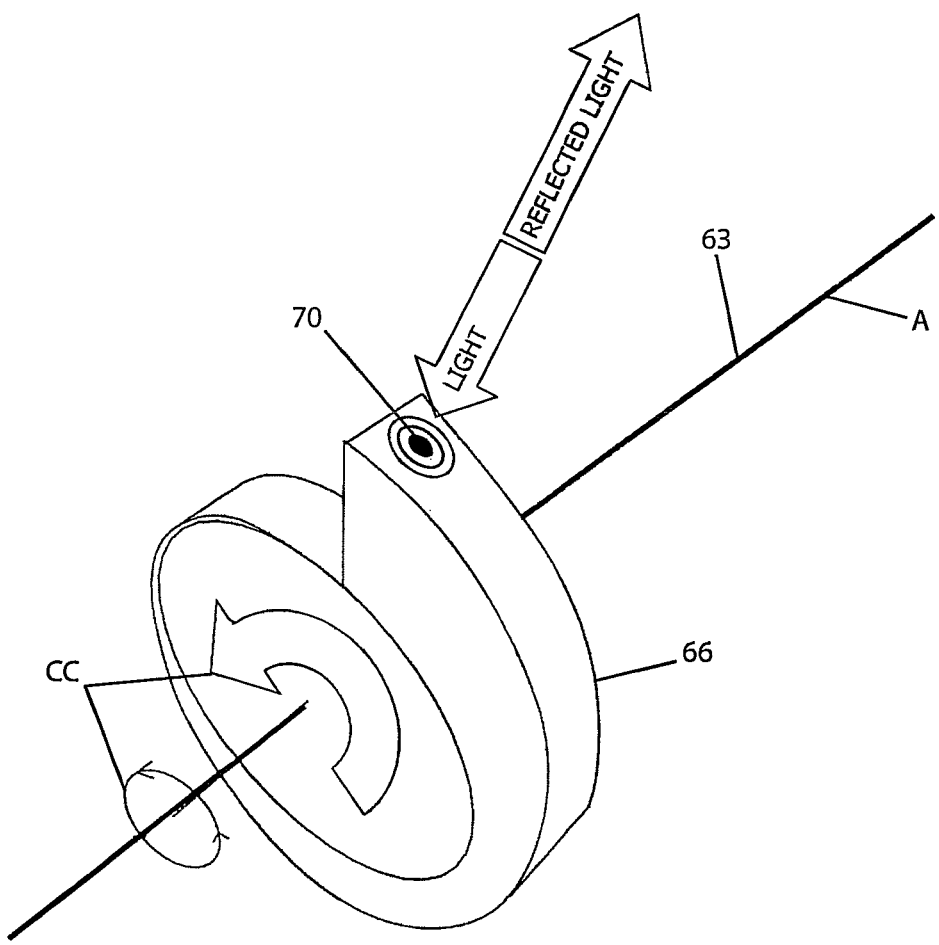
FIG. 6 illustrates a movable object in a position perpendicular to an axis of rotation of the movable object in accordance with an embodiment of the present invention.

FIG. 6 illustrates an embodiment of the present invention in which obtaining the signal for the rotational operation from the system 10 using the light source 20 and the light detector 22 may be accomplished in another manner. The signal for obtaining the rotational operation from the system 10 may be accomplished by increasing the distance between the movable object 23 and the sensor 30 as also shown in FIG. 1. FIG. 6 illustrates that an axis of rotation A of the movable object 23 may be counterclockwise as indicated by arrows CC. A target 70 may be represented and/or indicated by a circle shown in FIG. 6. However, the target 70 may not exist as a mark. The target 70 may be a place on which to focus the light and from which to receive the light. The light and the receivers do not move, but the spiral 66 may rotate. The system 10 may look at one spot at all times.

However, in an embodiment as described above, a physical mark may be made on the target 70 with a pencil, tape, a dent, a laser and/or the like to read the target 70 more efficiently and/or to change the signal output. For example, a digital signal may be used, and rotation may be read once every revolution. A mark may be made on the shaft 63, and the mark may be read every time the mark passes the same point in each revolution.

For example, the target 70 may not be painted on the movable object 23. The target 70 may be a reference point where the light from the light source 20 may be focused and reflected to the light detector 22. As shown in FIG. 6, the target 70 of the movable object 23 may be perpendicular to the axis of rotation of the movable object 23.

Figure 7:
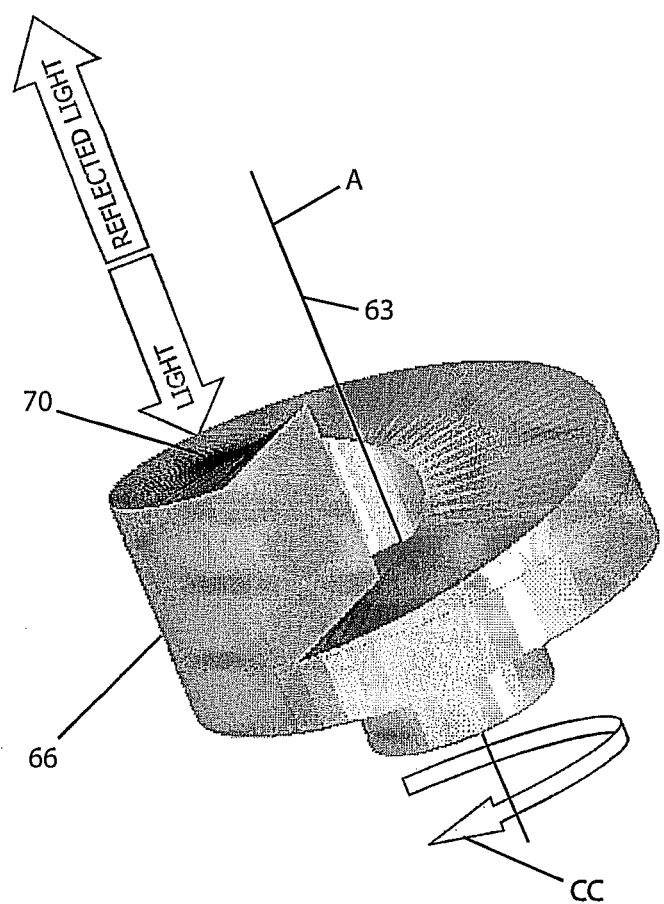
FIG. 7 illustrates a movable object in a position parallel to the axis of rotation of the movable object in accordance with an embodiment of the present invention.

FIG. 7 illustrates an embodiment of the present invention in which obtaining the signal for the rotational operation from the system 10 using the light source 20 and the light detector 22 may be accomplished by increasing the distance between the movable object 23 and the sensor 30. FIG. 7 illustrates that the axis of rotation A of the movable object 23 may be counterclockwise as shown by arrow CC. The target 70 may be represented and/or indicated by a circle shown in FIG. 7. However, the target 70 may not exist as a mark. For example, the target 70 may not be painted on the movable object 23. The target 70 may be a reference point where the light from the light source 20 may be focused and reflected to the light detector 22. As shown in FIG. 7, the target 70 of the movable object 23 may be parallel to the axis of rotation of the movable object 23.

Thus, the target 70 may be perpendicular to the axis of rotation of the movable object 23 as shown in FIG. 6, or the target 70 may be parallel to the axis of rotation of the movable object 23 as shown in FIG. 7. In FIG. 6, the spiral 66 may change along the vertical axis. In FIG. 7, the spiral 66 may change along the horizontal axis. In an embodiment, the light detector 22 may show changes in a moving shaft on two axes.

Figure 8:
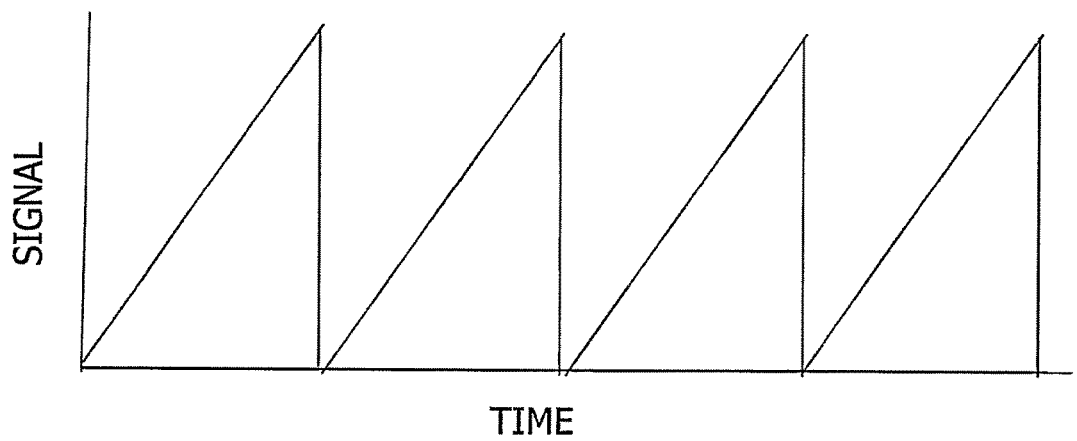
FIG. 8 illustrates a signal profile in accordance with an embodiment of the present invention.

FIG. 8 illustrates the profile of a signal generated by the sensor 30 for the system 10. The system 10 may obtain the signal for the rotational operation using the light source 20 and the light detector 22. FIG. 8 illustrates the magnitude of the signal on the y-axis and time on the x-axis. Thus, the signal shown in FIG. 8 may correspond to the reflected light measured by the light detector 22 from the target 70 shown in FIG. 6 and/or FIG. 7. The signal may be a voltage signal in an embodiment in which the light detector 22 may emit a voltage. The reflected output of light may be represented by a relationship in which the intensity of the light decreases with square of the distance from the light detector 22 in a 1/x2 curve. The gain and/or the shape of the signal curve may be controlled by the type of material used, the profile or shape, the texture, the color and/or the like coupled with electronics. The electronics may also change the gain and/or the shape of the signal curve.

Referring to the embodiment of FIG. 1, the apparatus, the system and the method for detecting position of a movable object in a device and using the same for controlling the device may detect the position of the movable object 23 on the rotating crankshaft 25 which may be a crankshaft within an engine. The position of the movable object 23 may be determined by the system 10. The system 10 may also have microprocessors and/or microcontrollers as disclosed in U.S. Pat. Nos. 7,388,188 B2, 8,436,287 B2, 8,115,185 B2, 7,935,916 B2 and 7,626,153 connected within the system 10.

The microprocessors and/or microcontrollers may be used in conjunction with an engine control unit (not shown). The engine control unit may manage certain functions and/or operations of the engine. For example, the combustion cycle may be controlled by the engine control unit. The engine control unit may also control the speed of rotation of the crankshaft 25 and the timing of combustion cycles, for examples. As a result, the system 10 may be used to adjust the timing of the engine for optimizing performance and/or efficiency.

The movable object 23 may be connected to the crankshaft to indicate when the piston may be located at top dead center, known as "TDC". For example, a line marked TDC in FIG. 1 may indicate the position of the crankshaft 25 with the piston located at TDC. As the crankshaft 25 may rotate within the engine, the movable object 23 may move relative to the sensor 30. The system 10 may determine the position of the movable object 23 at any time during rotation of the crankshaft 25. The system 10 may determine the position of the movable object 23 at TDC on each revolution of the crankshaft 25.

Further, the system 10 may utilize the sensor 30 to determine the position of the movable object 23 at any other point in the revolution of the crankshaft 25. The system 10 may determine the position of the movable object 23 within the time period of one revolution of the crankshaft 25. At any time during a revolution of the crankshaft 25, the system 10 may communicate the position of the movable object 23 to the engine control unit. The engine control unit may utilize the position information to adjust the timing of the engine. Further, the system 10 may be used in a dirty environment. The dirt may be centrifugally accelerated to the outermost perimeter which may keep a target area clean to enable the sensor 30 to read the position of the movable object 23.

Thus, the system 10 may provide location information of the movable object 23 to the engine control unit. The engine control unit may adjust the timing of the engine during a revolution without waiting until the movable object 23 may pass by TDC. For example, the system 10 may provide location information of the movable object 23 at any time during a revolution of the crankshaft 25 so that the engine control unit may advance and/or may retard the timing of the engine.

Accordingly, the system 10 may be used for detecting position of a movable object in a device and using the same for controlling the device. Preferably, the apparatus, system and method of the present invention may be used for detecting position of the movable object 23 in the engine and using the same for controlling the engine. Thus, the system 10 may allow the engine control unit and/or a user to adjust the timing of the engine for optimizing performance and/or efficiency. However, the invention should not be limited to detecting the position of the movable object 23 on the crankshaft 25 of the engine. The system 10 may also be used to detect the position of any movable object 23, as desired. Of course, other uses may be possible using the invention and are considered to be within the scope of the invention.

Moreover, the present invention is not limited to the specific arrangement of the components illustrated in the figures. It should be understood that various changes and modifications to the presently preferred embodiments described herein will be apparent to those having ordinary skill in the art. Such changes and modifications may be made without departing from the spirit and scope of the present invention and without diminishing its attendant advantages. It is, therefore, intended that such changes and modifications be covered by the appended claims.

I claim:

1. A system for detecting a position of a movable object in a device and controlling the device wherein the movable object rotates, the system comprising:
   only one light source located in the device wherein the one light source emits light having an intensity onto the movable object and further wherein the intensity of the light changes as the light reflects off the moveable object;
   only one detector adjacent to the one light source wherein the one detector detects the light reflected off the movable object, and measures the intensity of the detected light, and further wherein the one detector transmits a signal indicative of the position of the moveable object; and
   a cavity of the movable object adjacent to the one light source and comprising a top surface, a bottom surface, and sides connecting the top surface to the bottom surface,
   wherein the cavity is filled with oil and the one light source emits the light into the cavity,
   wherein the cavity comprises a non-constant height defined by the top surface and the bottom surface,
   wherein a distance at which the detected light travels in the cavity varies according to the non-constant height of the cavity, and
   wherein a change in the intensity of the detected light corresponds to a change in the distance at which the detected light travels in the cavity.

2. The system of claim 1 further comprising:
   a shaft having an exterior defined by a surface that is substantially circular wherein the moveable object is connected to the exterior of the shaft and rotates with the shaft.

3. The system of claim 1 further comprising:
   a processor associated with the one detector wherein the processor receives the signal from the one detector to determine the position of the movable object in the device and to control the device; and
   a monitor connected to the processor wherein the monitor receives the signal from the processor and further wherein the monitor uses the signal to display information.

4. The system of claim 1, wherein the bottom surface of the cavity is sloped with respect to the top surface thereof to define the non-constant height.

5. A method for detecting a position of a movable object and using the position to control a device wherein the movable object is connected to a shaft in the device and further wherein the movable object rotates with the shaft, the method comprising:
   focusing light from only one light source having an intensity onto a target on the movable object;
   reflecting the light off the target on the movable object;
   detecting via only one detector the light reflected off the target on the movable object;
   measuring via the one detector a change in the intensity of the detected light reflected off the target on the movable object;
   providing oil in a cavity of the movable object adjacent to the one light source, the movable object including a top surface, a bottom surface, and sides connecting the top surface to the bottom surface forming the cavity, wherein the one light source emits the light into the cavity, wherein the cavity has non-constant height defined by the top surface and the bottom surface, wherein a distance at which the detected light travels in the cavity varies according to the non-constant height of the cavity, wherein the target is the bottom surface of the cavity, and wherein the change in the intensity of the detected light corresponds to a change in the distance at which the detected light travels in the cavity;
   producing a signal indicative of the rotation of the movable object and the shaft; and
   determining the position of the movable object from the signal.

6. The method of claim 5 further comprising the step of: changing a timing of the rotation of the movable object.

7. The method of claim 5 further comprising the step of: optimizing performance of the device.

8. The method of claim 5 further comprising the step of: determining the position of the movable object at any location in a revolution of the moveable object.

9. An apparatus for detecting a signal indicative of a position of a movable object in a device, the apparatus comprising:

only one light source remote from the movable object wherein the one light source emits light having an intensity and further wherein the light reflects off the movable object;

only one detector positioned to detect the light reflected off the movable object and measure the intensity of the detected light reflected off the movable object; and a cavity of the movable object adjacent to the one light source and comprising a top surface, a bottom surface, and sides connecting the top surface to the bottom surface, wherein the cavity contains oil and the one light source emits the light into the cavity, wherein the cavity has a non-constant height defined by the top surface and the bottom surface, wherein a distance at which the detected light travels in the cavity varies according to the non-constant height of the cavity, and wherein a change in the intensity of the detected light corresponds to a change in the distance at which the detected light travels in the cavity.

10. The apparatus of claim 9 wherein the bottom surface defines a target on the movable object and wherein the light reflects off the target.

11. The apparatus of claim 9 further comprising:
a shaft having a first end and second end wherein the second end is positioned opposite to the first end wherein the movable object is connected to the shaft between the first end and the second end and further wherein the shaft rotates with the movable object.

12. The apparatus of claim 9 further comprising:
a processor associated with the one detector wherein the processor receives the signal from the one detector to determine the position of the movable object in the device; and
a monitor connected to the processor wherein the monitor receives the signal from the processor to display information related to the signal.

13. The apparatus of claim 9, wherein the bottom surface of the cavity is sloped with respect to the top surface thereof to define the non-constant height.

* * * * *